US010731686B1

(12) United States Patent
Granek

(10) Patent No.: US 10,731,686 B1
(45) Date of Patent: Aug. 4, 2020

(54) SYSTEM OF INTERCONNECTING UNITS

(71) Applicant: Harold Granek, Granbury, TX (US)

(72) Inventor: Harold Granek, Granbury, TX (US)

( * ) Notice: Subject to any disclaimer, the term of this patent is extended or adjusted under 35 U.S.C. 154(b) by 296 days.

(21) Appl. No.: 15/804,003

(22) Filed: Nov. 6, 2017

(51) Int. Cl.
*A63H 33/08* (2006.01)
*F16B 7/02* (2006.01)
*F16B 1/00* (2006.01)

(52) U.S. Cl.
CPC ........ *F16B 7/02* (2013.01); *F16B 2001/0035* (2013.01)

(58) Field of Classification Search
CPC ...... A63H 33/046; A63H 33/06; A63H 33/08; A63H 33/103; A63H 33/04; A63H 33/062; A63H 33/065; A63H 33/086
See application file for complete search history.

(56) References Cited

U.S. PATENT DOCUMENTS

| | | | | |
|---|---|---|---|---|
| 4,026,086 A * | 5/1977 | Langley | .................... | E04B 2/06 52/592.6 |
| 4,516,364 A * | 5/1985 | Heider | ...................... | E04C 1/40 52/590.1 |
| 5,000,713 A * | 3/1991 | Cheng | .................... | A63H 33/06 273/160 |
| 7,507,136 B2 * | 3/2009 | Patton | .................. | A63H 33/046 335/285 |
| 7,749,042 B2 * | 7/2010 | Fulgenzi | ................ | A63H 33/06 446/108 |
| 2005/0159076 A1 * | 7/2005 | Kowalski | ............... | A63H 33/26 446/137 |
| 2009/0197500 A1 * | 8/2009 | Song | .................... | A63H 33/046 446/92 |
| 2009/0298382 A1 * | 12/2009 | Ochi | .................... | A63H 33/062 446/121 |
| 2012/0302127 A1 * | 11/2012 | Doskas | ................ | A63H 33/046 446/92 |
| 2012/0322339 A1 * | 12/2012 | Kim | ........................ | A63H 33/08 446/92 |

* cited by examiner

*Primary Examiner* — Daniel J Wiley
(74) *Attorney, Agent, or Firm* — James E. Walton

(57) ABSTRACT

A system interconnecting units having conical shaped studs and recess for fabrication of building blocks, materials, furniture, toys, all typically having a three axis aligned array of elements. Units utilize orthogonal members having a combination of studs and recesses to allow various units to combine into combined units. Magnets can assist in attracting adjacent units together and keeping recesses and studs together. Studs and recesses are complimentary shapes, such as pyramids, cones, rounded cones, lipped pyramids, rods and cylinders.

20 Claims, 12 Drawing Sheets

1201

1301

1401

1501

1601

1701

1801

SYSTEM OF INTERCONNECTING UNITS

BACKGROUND

1. Field of the Invention

The present invention relates generally to a system of interconnecting units, and more specifically to a system of interconnecting units having a plurality of aligned studs and recesses.

2. Description of Related Art

Conventional interconnecting units are limited because the interconnecting elements only retain portions of the corresponding element. For example, interconnect units having protruding cylinders are conventionally retained by four points on the side of the cylinder. Furthermore, the top of the cylinder is conventionally unused when coupling one interconnecting unit to another. Thus, there exists significant room for improvement in the art interconnecting units.

DESCRIPTION OF THE DRAWINGS

The novel features believed a characteristic of the embodiments of the present application is set forth in the appended claims. However, the embodiments themselves, as well as a preferred mode of use, and further objectives and advantages thereof will best be understood by reference to the following detailed description when read in conjunction with the accompanying drawings, wherein:

Figure 1A:
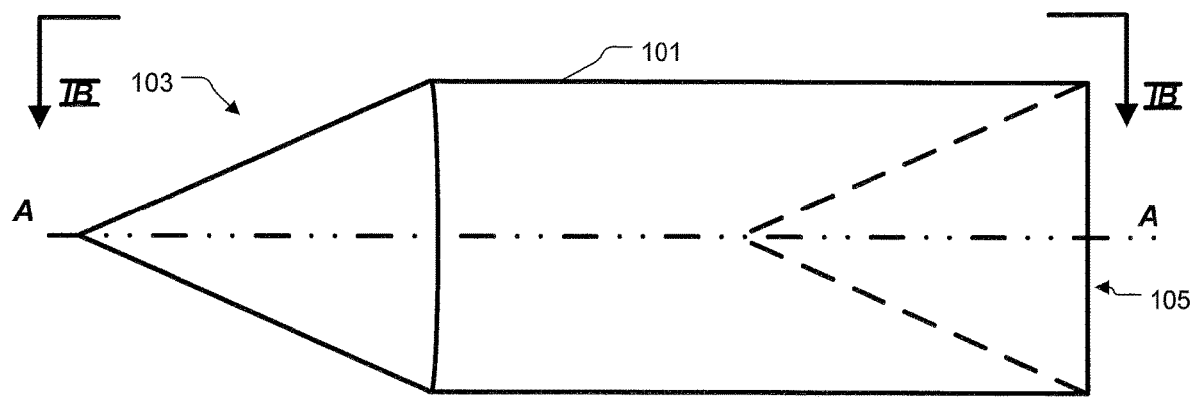
FIG. 1A is a plan diagram of an interconnecting unit according to the present application.

While the assembly and method of the present application are susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system of interconnecting units are provided below. It will, of course, be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A system interconnecting units having conical shaped studs and recess for fabrication of building blocks, materials, furniture, toys, all typically having a three axis aligned array of elements. Units utilize orthogonal members having a combination of studs and recesses to allow various units to combine into combined units. Magnets can assist in attracting adjacent units together and keeping recesses and studs together. Studs and recesses are complimentary shapes, such as pyramids, cones, rounded cones, lipped pyramids, rods and cylinders. Furthermore, other components are adapted to fit with these units such as wheels, hinges, locks, lighting elements, slides, clips, grooves. Structures having hundreds and thousands of individual combined units are possible because of the orthogonal alignment of members in each individual unit.

Figure 1B:
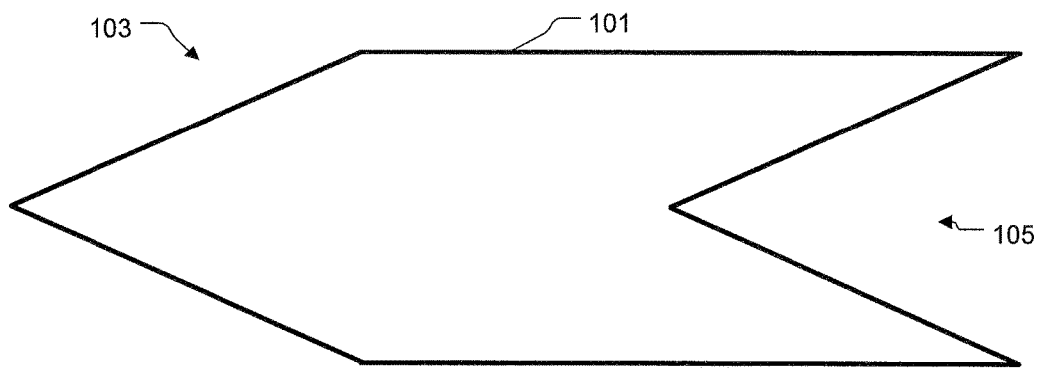
FIG. 1B is a section view of the interconnecting unit of FIG. 1A according to the present application.

Referring now to FIGS. 1A and 1B in the drawings, an embodiment of the interconnecting unit according to the present application is illustrated. Unit 101 is comprised of a stud 103 and a recess 105. Both the stud 103 and the recess 105 are aligned along axis A-A. FIG. 1B illustrates a section view of unit 101. Recess 105 and stud 103 are complementary shapes such that adjacent interconnecting units can be coupled together by inserting one stud into another's recess. It should be apparent that the entire surface of recess 105 would be in contact with the entire surface of the corresponding stud thereby increasing adhesion and strength between adjacent interconnecting units. Since both stud 103 and recess 105 are conical in shape interconnected units can rotate about the coupled axis.

Figure 2:
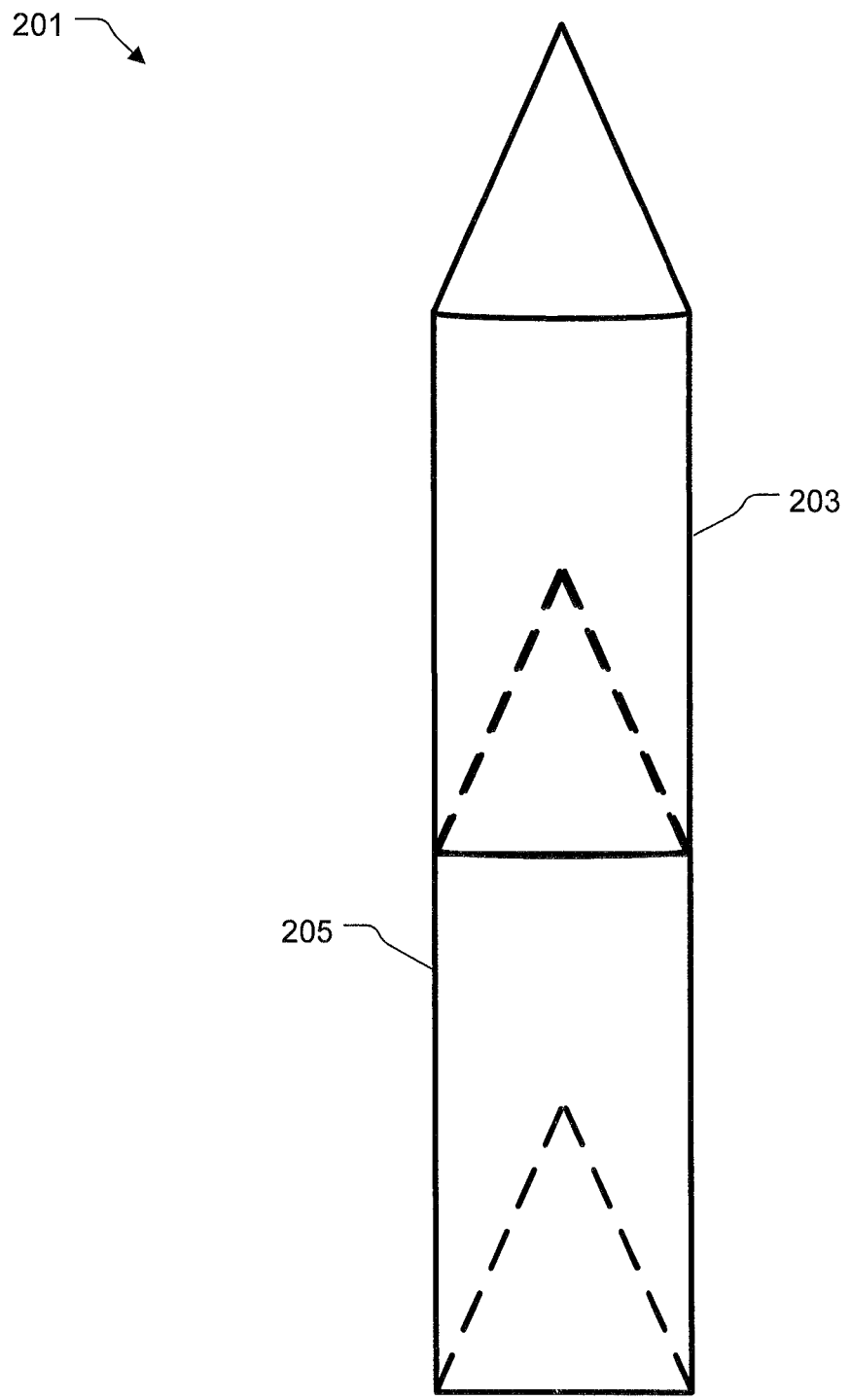
FIG. 2 is a plan diagram of two coupled interconnecting units according to the present application.
Figure 3A:
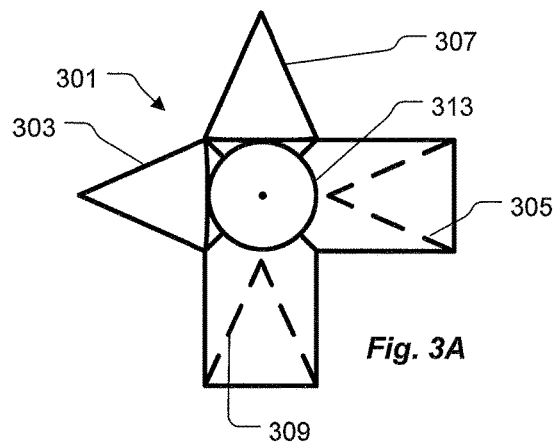
FIG. 3A is a top view of an interconnecting unit according to the present application.
Figure 3B:
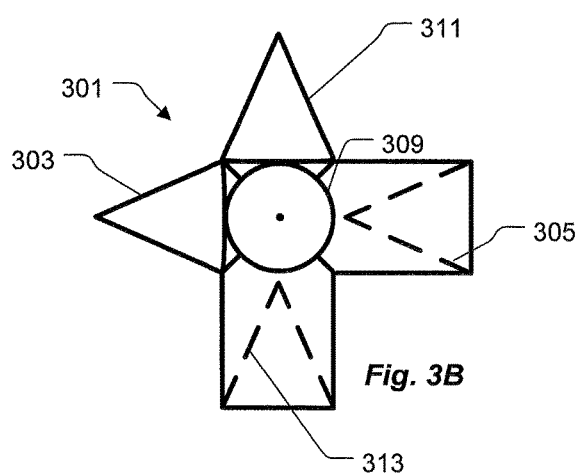
FIG. 3B is a side view of an interconnecting unit according to the present application.
Figure 3D:
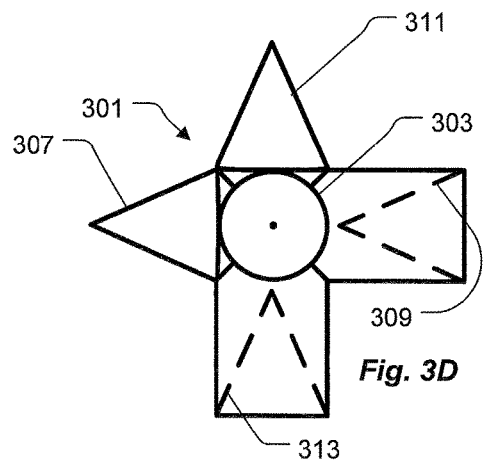
FIG. 3D is an end view of an interconnecting unit according to the present application.
Figure 3C:
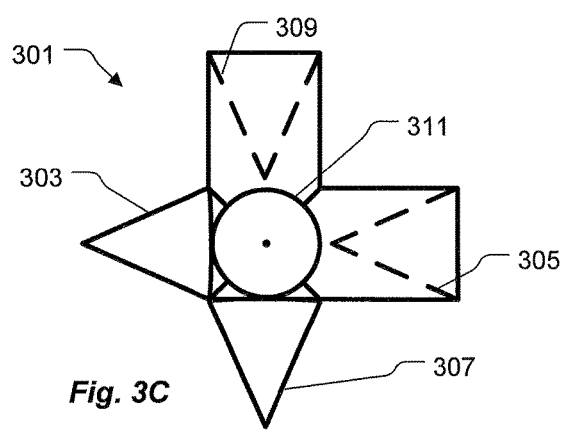
FIG. 3C is a bottom view of an interconnecting unit according to the present application.
Figure 3E:
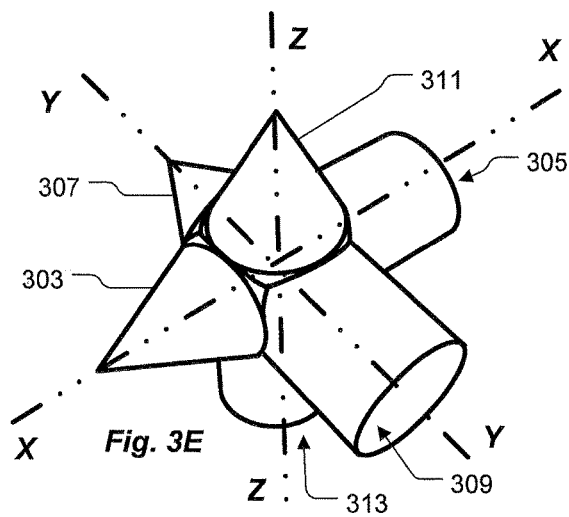
FIG. 3E is a generally perspective view of an interconnecting unit according to the present application.
Figure 4A:
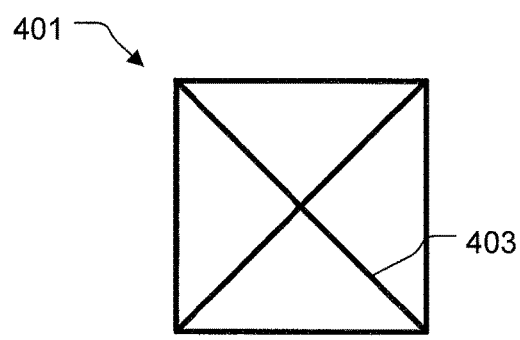
FIG. 4A is a top view of an interconnecting unit according to the present application.
Figure 4B:
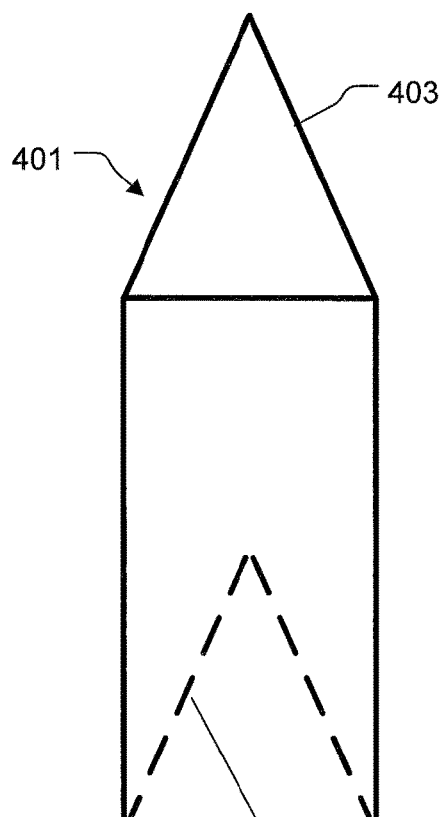
FIG. 4B is a side view of an interconnecting unit according to the present application.
Figure 4C:
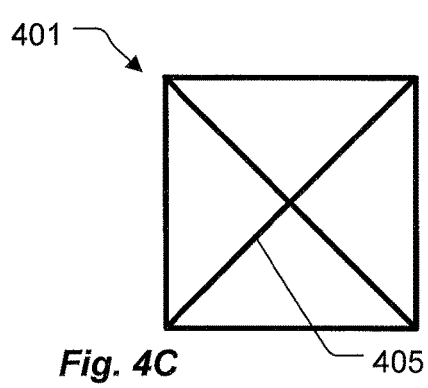
FIG. 4C is a bottom view of an interconnecting unit according to the present application.
Figure 4D:
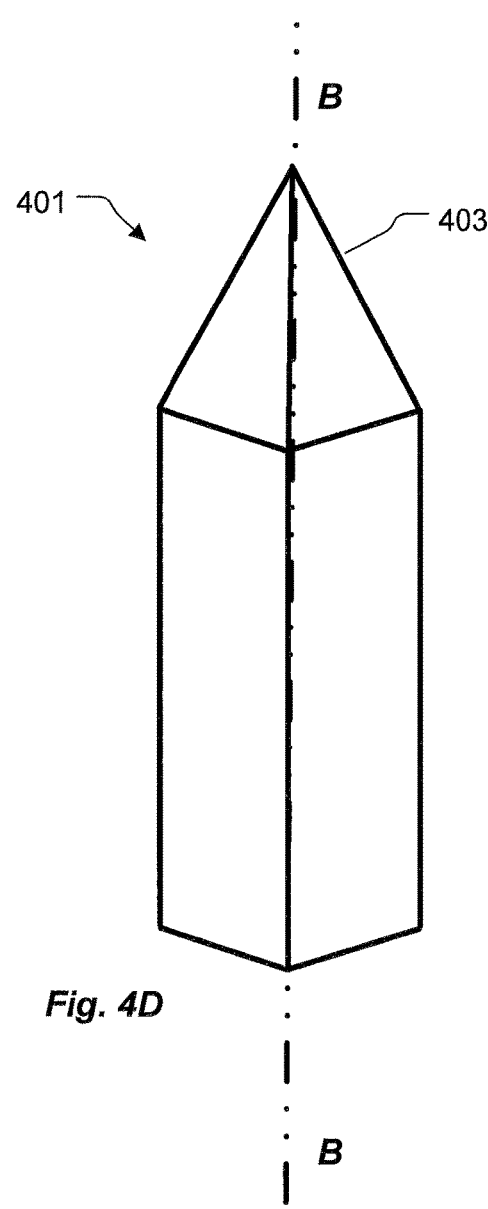
FIG. 4D is a generally perspective view of an interconnecting unit according to the present application.
Figure 5A:
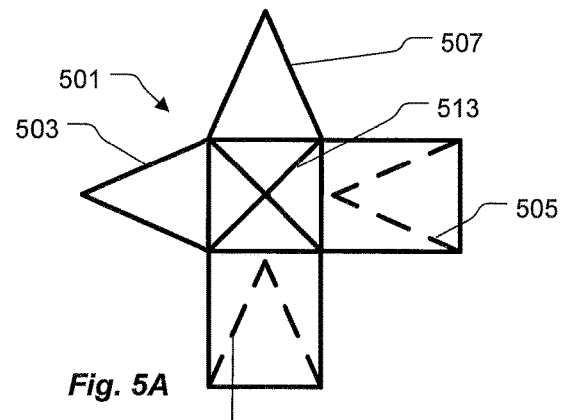
FIG. 5A is a top view of an interconnecting unit according to the present application.
Figure 5B:
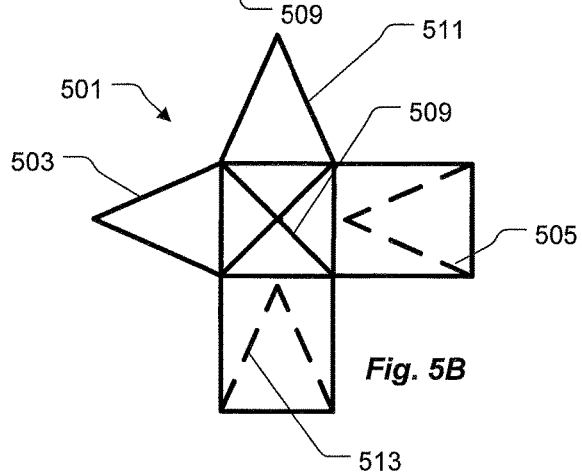
FIG. 5B is a side view of an interconnecting unit according to the present application.
Figure 5D:
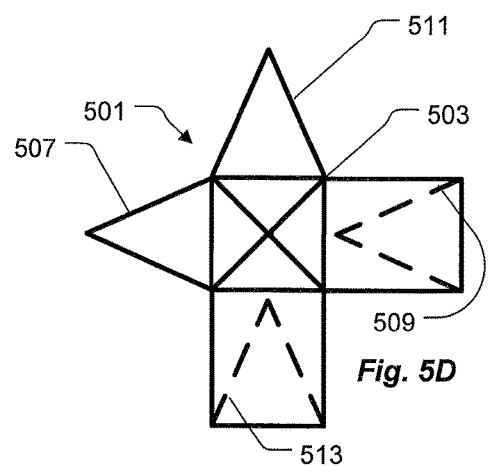
FIG. 5D is an end view of an interconnecting unit according to the present application.
Figure 5C:
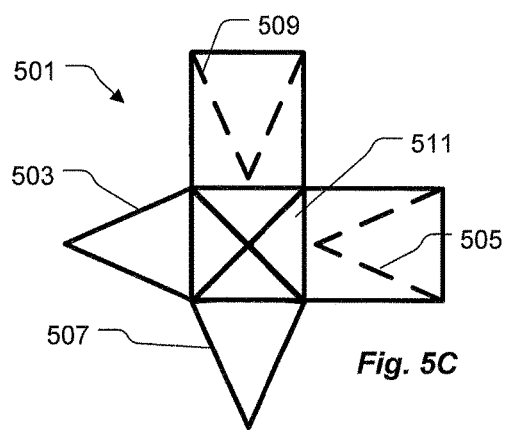
FIG. 5C is a bottom view of an interconnecting unit according to the present application.
Figure 5E:
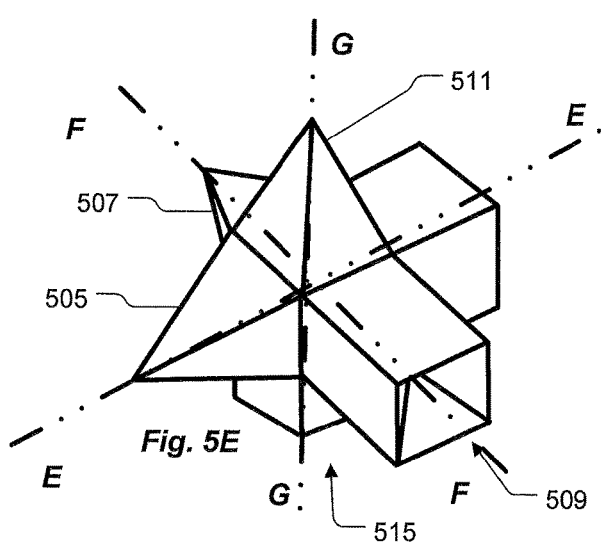
FIG. 5E is a generally perspective view of an interconnecting unit according to the present application.

Referring now to FIG. 2 in the drawings, an embodiment of multiple interconnecting units according to the present application is illustrated. System 201 is comprised of a first unit 203 coupled to a second unit 205. Each of the first unit 203 and second unit 205 is comprised of a stud and a recess. As illustrated, by the hidden lines, the stud of the second unit 205 is retained by the recess of the first unit 203. While only two units are illustrated, it should be apparent that more units can be connected to form a tubular member with each axis of each unit being collinear.

Referring now to FIGS. 3A-3E in the drawings, a preferred embodiment of the interconnecting unit according to the present application is illustrated. Unit 301 is comprised of three pairs of studs and recesses. In this embodiment, all the studs and recesses are conical in shape. First stud 303 and first recess 305 are located along and collinear with axis X-X. The second stud 307 and second recess 309 are located along and collinear with axis Y-Y. Third stud 311 and third recess 313 are located along and collinear with axis Z-Z. Each axis is orthogonal to each other axis, furthermore each element of the unit 301 is formed as an integral one-piece member without seams.

Referring now to FIGS. 4A-4D in the drawings, an alternative embodiment of the interconnecting unit according to the present application is illustrated. Unit 401 is comprised of a stud 403 and a recess 405. Both the stud 403 and the recess 405 are aligned along axis B-B. Recess 405 and stud 403 are complementary shapes such that adjacent interconnecting units can be coupled together by inserting one stud into another's recess. It should be apparent that the entire surface of recess 405 would be in contact with the entire surface of the corresponding stud thereby increasing adhesion and strength between adjacent interconnecting units. Since both stud 403 and recess 405 are right pyramids in shape interconnected units can only rotate about the coupled axis in ninety degrees increments.

Referring now to FIGS. 5A-5E in the drawings, an alternative embodiment of the interconnecting unit according to the present application is illustrated. Unit 501 is comprised of three pairs of studs and recesses. In this embodiment, all the studs and recesses are pyramidal in shape. First stud 503 and first recess 505 are located along and collinear with axis E-E. The second stud 507 and second recess 509 are located along and collinear with axis F-F. Third stud 511 and third recess 513 are located along and collinear with axis G-G. Each axis is orthogonal to each other axis.

Figure 6A:
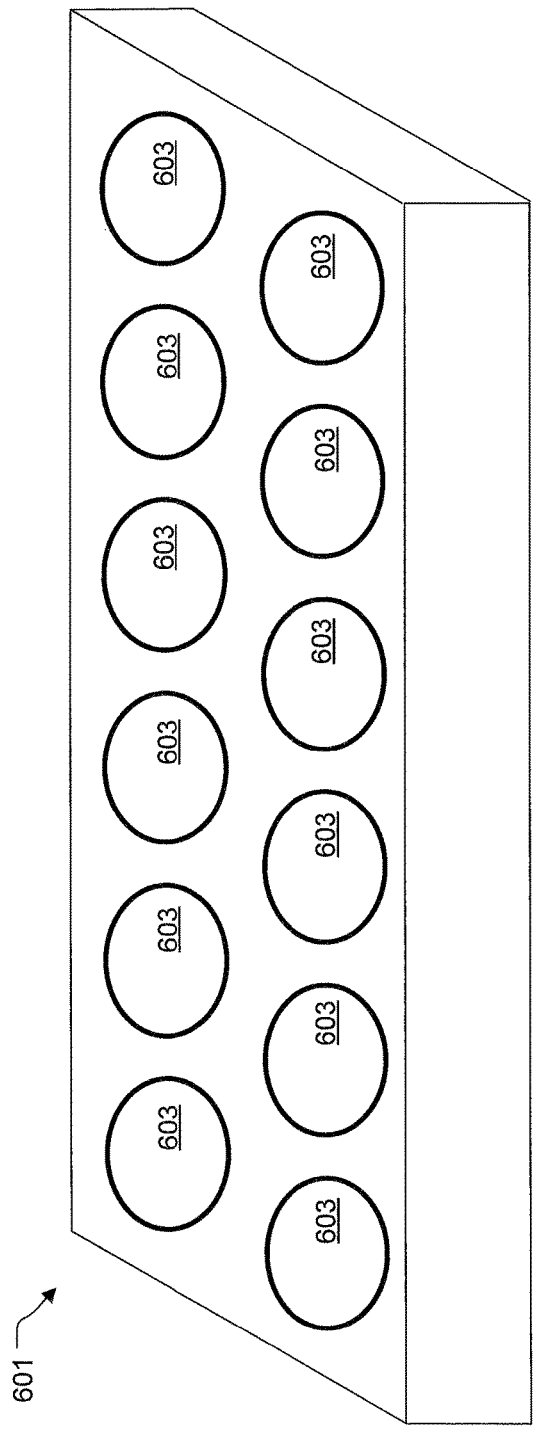
FIG. 6A is a generally perspective view of an interconnecting unit plate according to the present application.
Figure 6B:
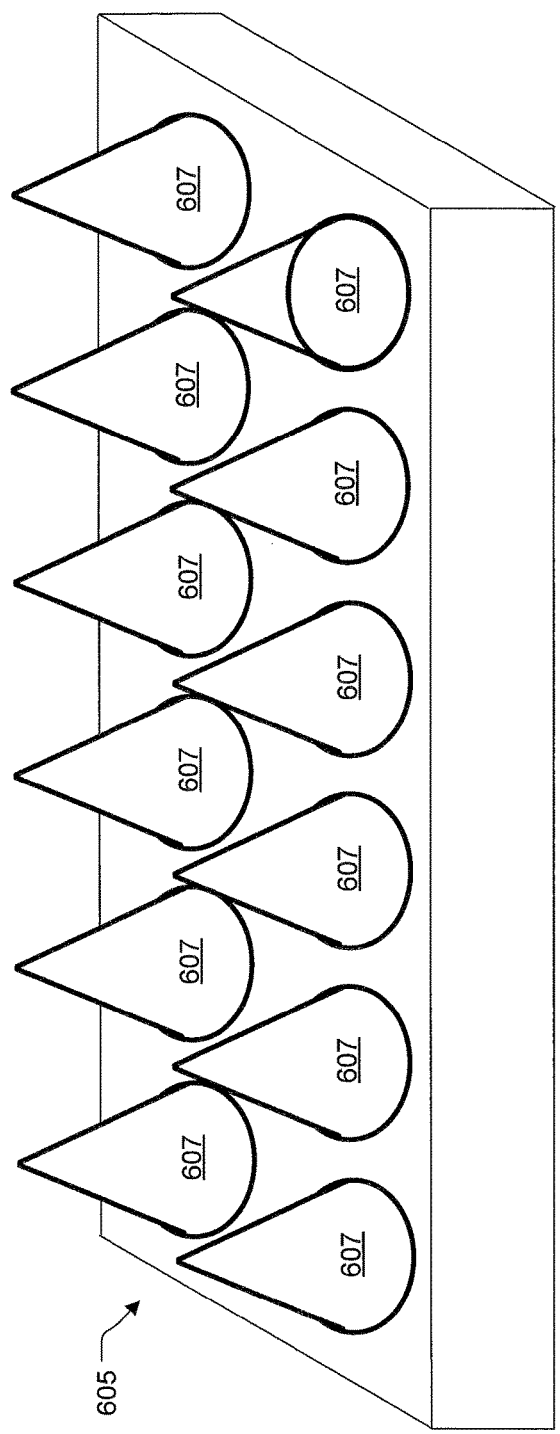
FIG. 6B is a generally perspective view of an interconnecting unit plate according to the present application.

Referring now to FIGS. 6A and 6B in the drawings, embodiments of an interconnecting unit plate according to the present application is illustrated. Plate 601 is comprised of an arrayed plurality of recesses 603. Multiple interconnecting units can be coupled together and finished by coupling plate 601 to the multiple interconnecting units and preventing users contact with the sharpness of the studs. Plate 605 is comprised of an arrayed plurality of studs 607. Multiple interconnecting units can be coupled together and finished by coupling plate 605 to the multiple interconnecting units.

Figure 7:
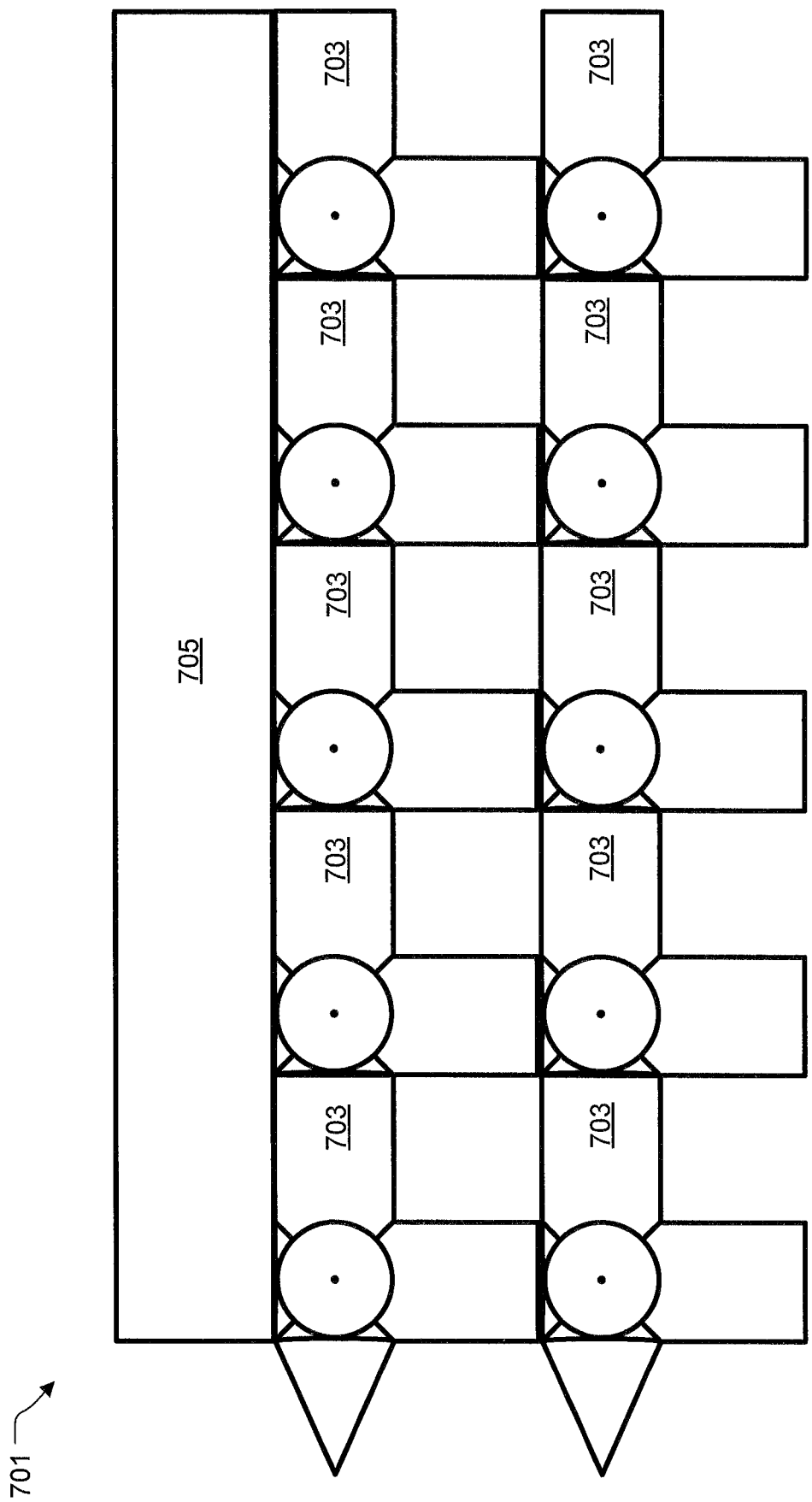
FIG. 7 is a plan diagram of a system of interconnecting units according to the present application.
Figure 8A:
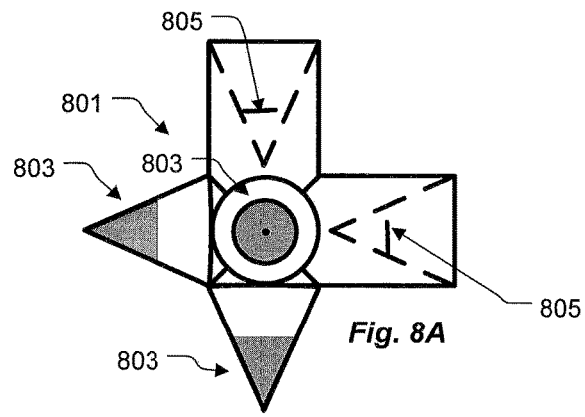
FIG. 8A is a top view of an interconnecting unit according to the present application.
Figure 8B:
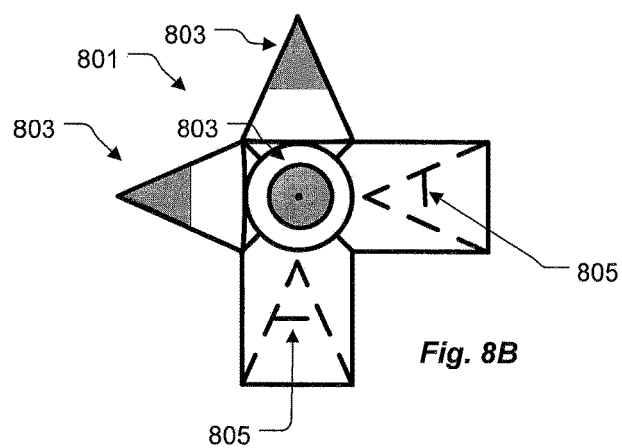
FIG. 8B is a side view of an interconnecting unit according to the present application.
Figure 8D:
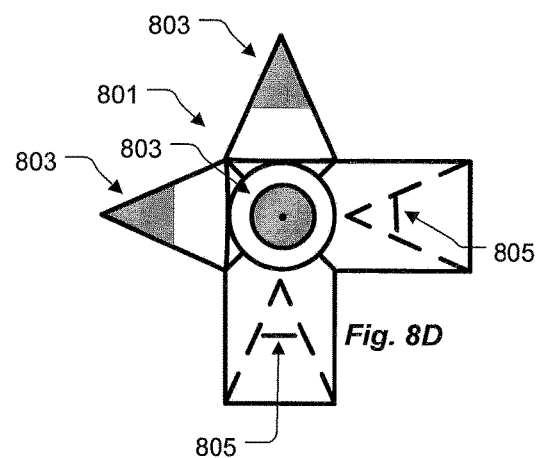
FIG. 8D is an end view of an interconnecting unit according to the present application.
Figure 8C:
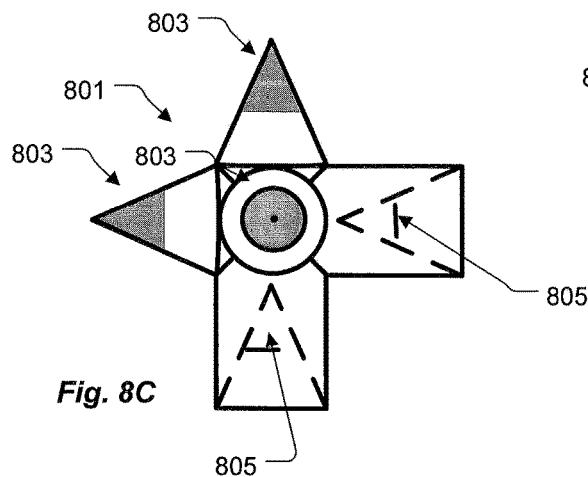
FIG. 8C is a bottom view of an interconnecting unit according to the present application.
Figure 8E:
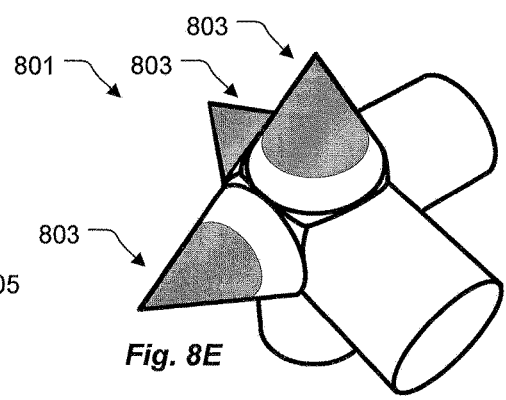
FIG. 8E is a generally perspective view of an interconnecting unit according to the present application.
Figure 9A:
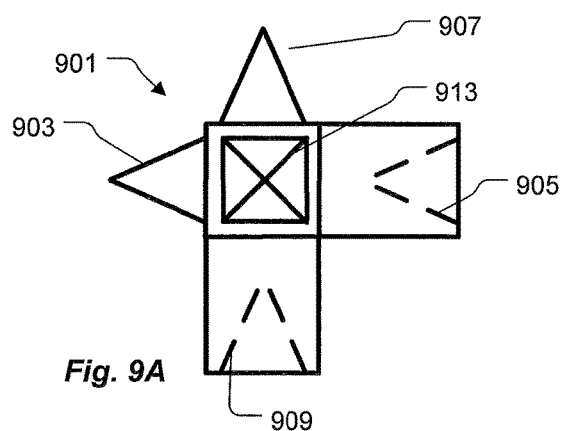
FIG. 9A is a top view of a lipped interconnecting unit according to the present application.
Figure 9B:
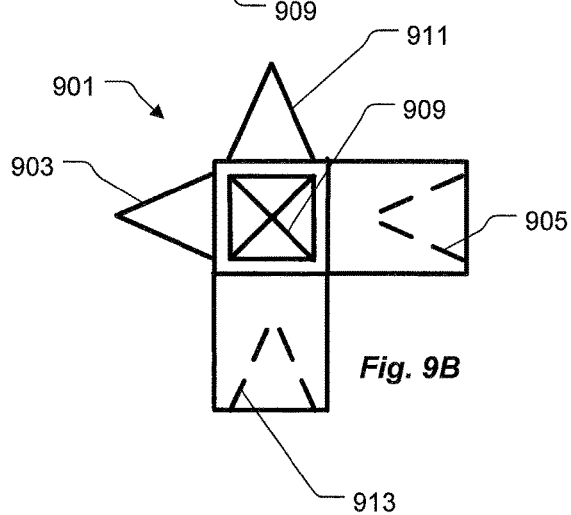
FIG. 9B is a side view of a lipped interconnecting unit according to the present application.
Figure 9D:
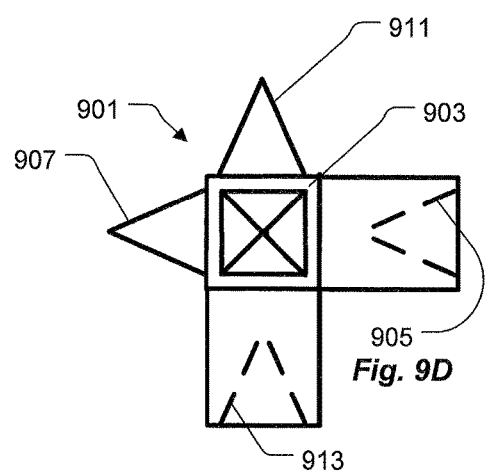
FIG. 9D is an end view of a lipped interconnecting unit according to the present application.
Figure 9C:
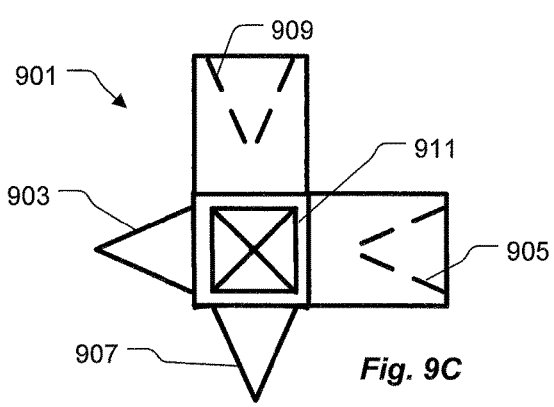
FIG. 9C is a bottom view of a lipped interconnecting unit according to the present application.
Figure 9E:
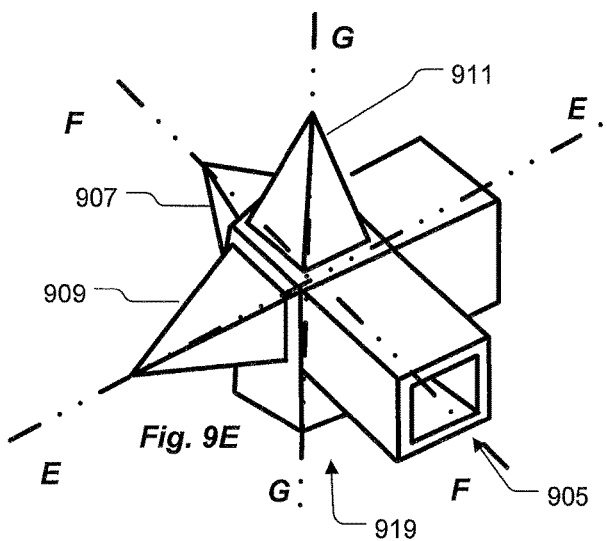
FIG. 9E is a generally perspective view of a lipped interconnecting unit according to the present application.
Figure 10A:
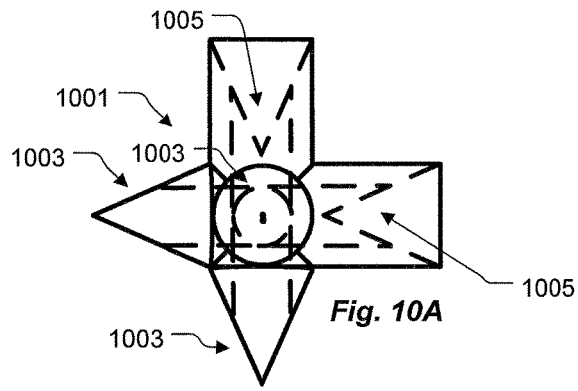
FIG. 10A is a top view of an interconnecting unit with recessed rod magnets according to the present application.
Figure 10B:
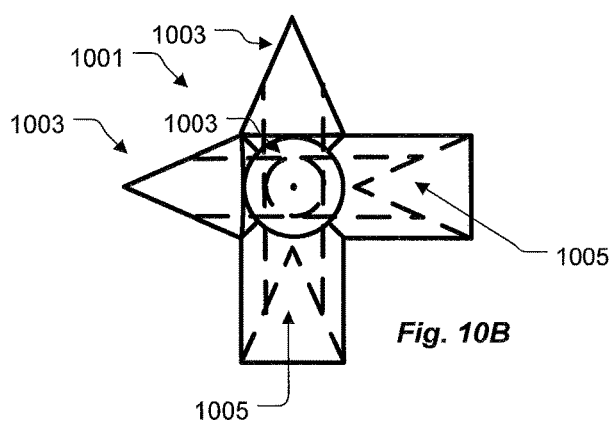
FIG. 10B is a side view of an interconnecting unit with recessed rod magnets according to the present application.
Figure 10D:
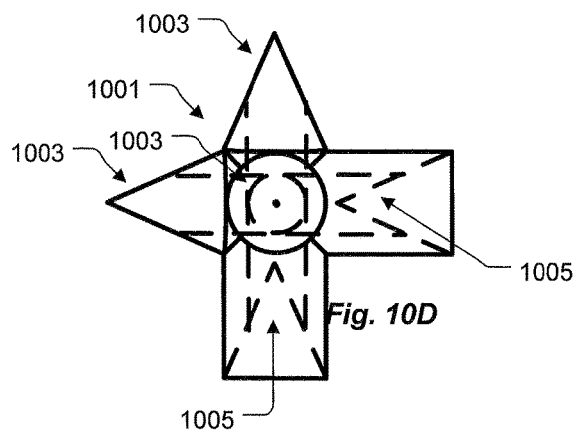
FIG. 10D is an end view of an interconnecting unit with recessed rod magnets according to the present application.
Figure 10C:
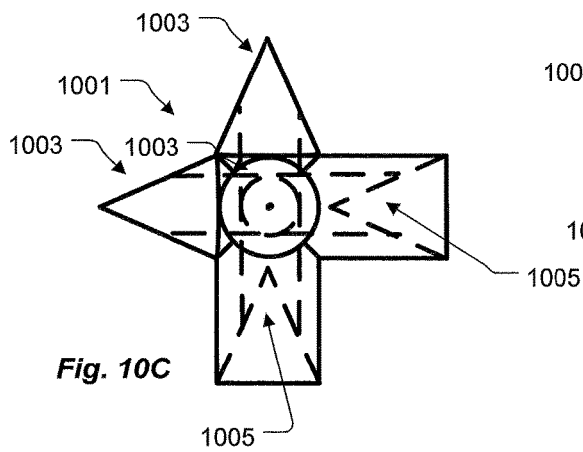
FIG. 10C is a bottom view of an interconnecting unit with recessed rod magnets according to the present application.
Figure 10E:
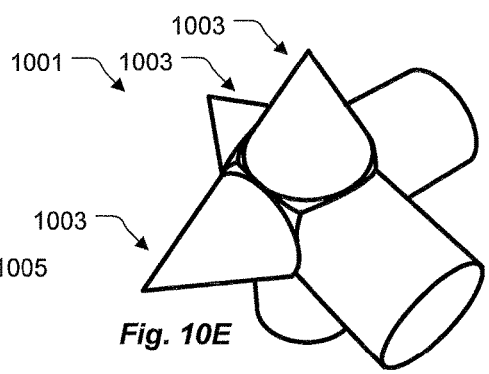
FIG. 10E is a generally perspective view of an interconnecting unit with recessed rod magnets according to the present application.
Figure 11A:
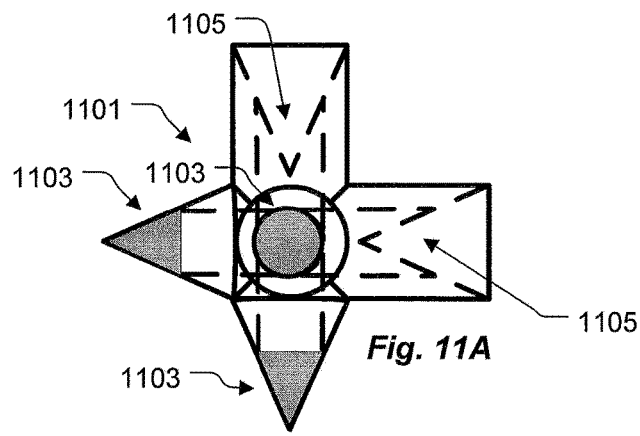
FIG. 11A is a top view of an interconnecting unit with exposed rod magnets according to the present application.
Figure 11B:
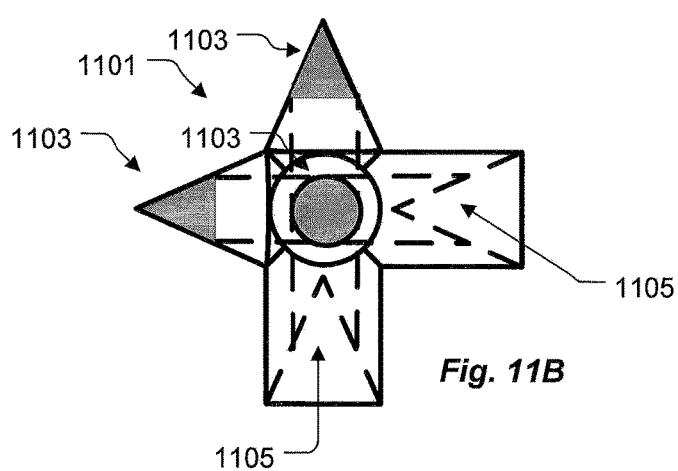
FIG. 11B is a side view of an interconnecting unit with exposed rod magnets according to the present application.
Figure 11D:
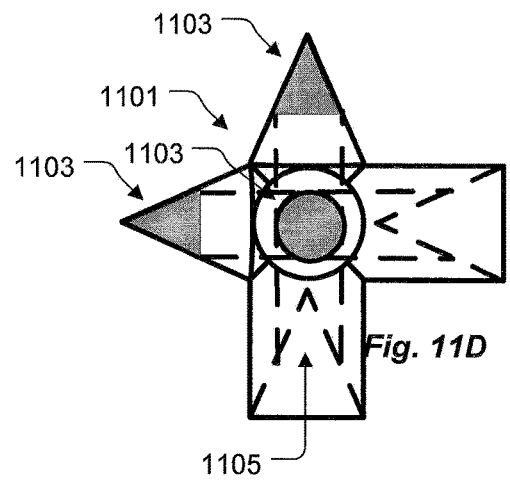
FIG. 11D is an end view of an interconnecting unit with exposed rod magnets according to the present application.
Figure 11C:
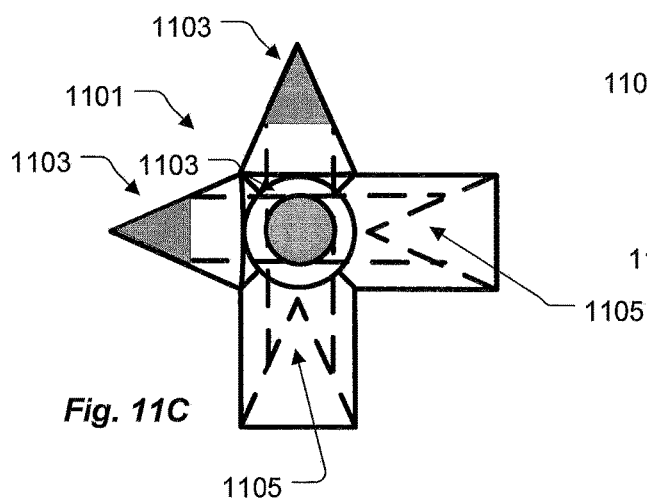
FIG. 11C is a bottom view of an interconnecting unit with exposed rod magnets according to the present application.
Figure 11E:
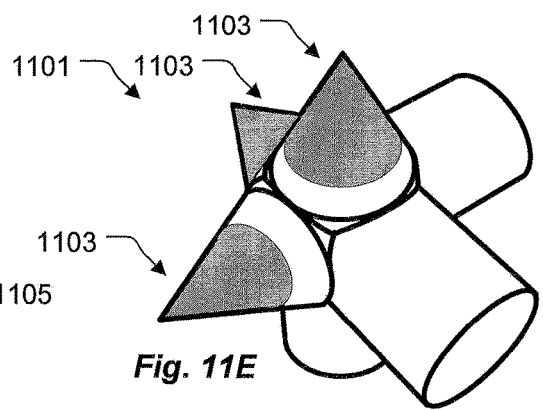
FIG. 11E is a generally perspective view of an interconnecting unit with exposed rod magnets according to the present application.

Referring now to FIG. 7 in the drawings, an embodiment of an interconnecting unit system according to the present application is illustrated. System 701 is comprised of a plurality of units 703 and a plate 705. The system 701 is configured to support compressive loads because of the orientation of the studs and recesses of each unit.

Referring now to FIGS. 8A-8E in the drawings, an alternative embodiment of the interconnecting unit according to the present application is illustrated. Unit 801 is comprised of three pairs of studs and recesses. In this embodiment, all the studs and recesses are conical in shape. Each stud comprises a first magnet 803 of a first polarity and each recess comprises a second magnet 805 of a second polarity so that recesses and studs are magnetically attracted to each other. Thereby each unit not only relies upon the friction of the stud to recess, the magnetic force keeps structures made of units 801 together tighter.

Referring now to FIGS. 9A-9E in the drawings, an alternative embodiment of the interconnecting unit according to the present application is illustrated. Unit 901 is comprised of three pairs of studs and recesses having a lip around each. In this embodiment, all the studs and recesses are pyramidal in shape. First stud 903 and first recess 905 are located along and collinear with axis E-E. The second stud 907 and second recess 909 are located along and collinear with axis F-F. Third stud 911 and third recess 913 are located along and collinear with axis G-G. Each axis is orthogonal to each other axis.

Referring now to FIGS. 10A-10E in the drawings, an alternative embodiment of the interconnecting unit according to the present application is illustrated. Unit 1001 is comprised of three pairs of studs and recesses. In this embodiment, all the studs and recesses are conical in shape with rod shaped magnets along all center axis. Each stud comprises a first magnet having a first end 1003 of a first polarity and each recess comprises a second end 1005 of a second polarity so that recesses and studs are magnetically attracted to each other. Thereby each unit not only relies upon the friction of the stud to recess, the magnetic force keeps structures made of units 1001 together tighter. The magnets of the unit 1001 are recessed below the surface of the unit.

Referring now to FIGS. 11A-11E in the drawings, an alternative embodiment of the interconnecting unit according to the present application is illustrated. Unit 1101 is comprised of three pairs of studs and recesses. In this embodiment, all the studs and recesses are conical in shape with rod shaped magnets along all center axis. Each stud comprises a first magnet having a first end 1103 of a first polarity and each recess comprises a second end 1105 of a second polarity so that recesses and studs are magnetically attracted to each other. Thereby each unit not only relies upon the friction of the stud to recess, the magnetic force keeps structures made of units 1101 together tighter. The magnets of the unit 1001 are exposed at the surface of the unit.

Figure 12:
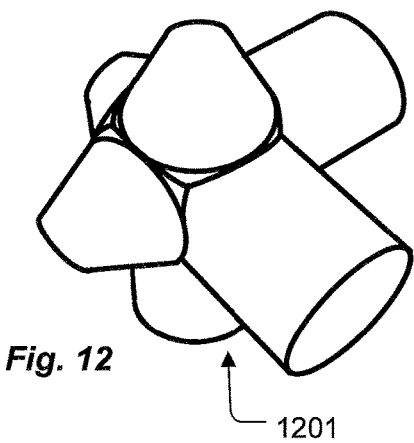
FIG. 12 is a generally perspective view of an interconnecting unit with rounded vertices according to the present application.

Referring now to FIG. 12 in the drawings, an alternative embodiment of the interconnecting unit according to the present application is illustrated. Unit 1201 is comprised of three pairs of studs and recesses each with rounded vertices.

Figure 13:
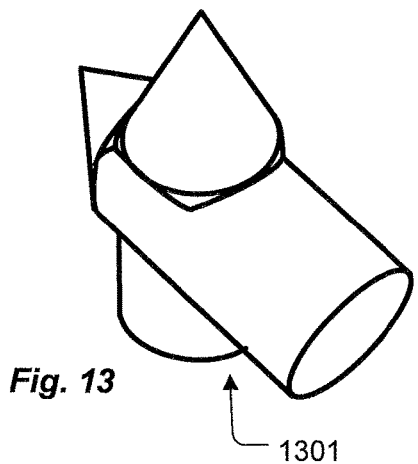
FIG. 13 is a generally perspective view of an flat interconnecting unit according to the present application.

Referring now to FIG. 13 in the drawings, an alternative embodiment of the interconnecting unit according to the present application is illustrated. Unit 1301 is comprised of two pairs of studs and recesses each with vertices.

Figure 14:
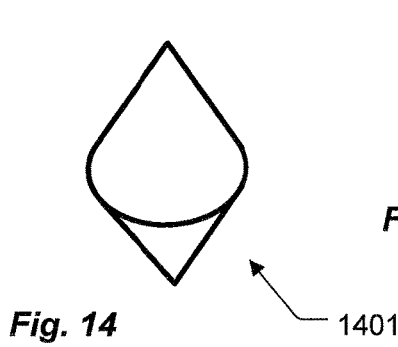
FIG. 14 is a generally perspective view of a double ended interconnecting unit with studs according to the present application.

Referring now to FIG. 14 in the drawings, an alternative embodiment of the interconnecting unit according to the present application is illustrated. Unit 1401 is comprised of two studs.

Figure 15:
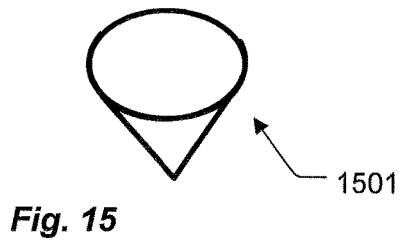
FIG. 15 is a generally perspective view of a cap interconnecting unit with studs according to the present application.

Referring now to FIG. 15 in the drawings, an alternative embodiment of the interconnecting unit according to the present application is illustrated. Unit 1501 is a cap and comprised of one stud and one flat surface.

Figure 16:
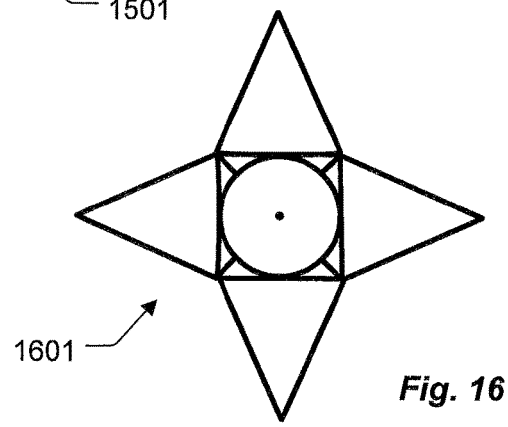
FIG. 16 is a generally perspective view of an interconnecting unit with all studs according to the present application.

Referring now to FIG. 16 in the drawings, an alternative embodiment of the interconnecting unit according to the present application is illustrated. Unit 1601 is comprised of six studs.

Figure 17:
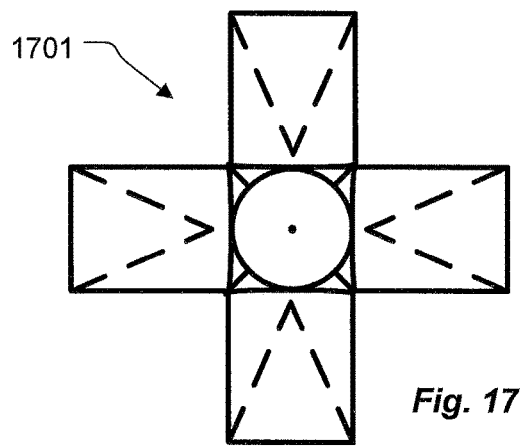
FIG. 17 is a generally perspective view of an interconnecting unit with all recesses according to the present application.

Referring now to FIG. 17 in the drawings, an alternative embodiment of the interconnecting unit according to the present application is illustrated. Unit 1701 is comprised of six recesses.

Figure 18:
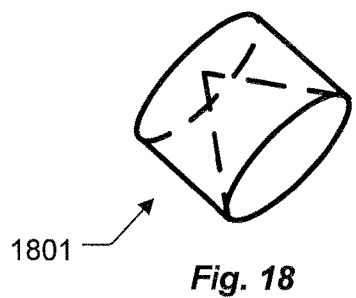
FIG. 18 is a generally perspective view of a cap interconnecting unit with studs according to the present application.

Referring now to FIG. 18 in the drawings, an alternative embodiment of the interconnecting unit according to the present application is illustrated. Unit 1801 is a cap and comprised of one recess and one flat surface. The hidden lines were added to ease understanding of the shape of the recess and of the flat surface.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments but are amenable to various changes and modifications without departing from the spirit thereof.

What is claimed is:

1. A system of interconnecting units, comprising:
    at least a first unit and a second unit;
    the first unit having at least a first element along a first axis and a second element along a second axis:
        wherein the first element comprises:
            a first stud; and
            a first recess;
        wherein the second element comprises:
            a second stud: and
            a second recess:
        wherein each element has a cross-section with a base-width equal to the base-width of the stud of that element: and
    the second unit having at least a first element along a first axis and a second element along a second axis:
        wherein the first element comprises:
            a first stud; and
            a first recess;
        wherein the second element comprises:
            a second stud; and
            a second recess:
        wherein each element has a cross-section with a base-width equal to the base-width of the stud of that element;
        wherein all of the studs and recesses are of a complementary, tapered shape; and
    wherein the first recess of the first unit retains the first stud of the second unit.

2. The system of interconnecting units according to claim 1, wherein all of the studs are conical in shape.

3. The system of interconnecting units according to claim 2, wherein all of the vertices of each stud are rounded.

4. The system of interconnecting units according to claim 1, wherein all of the studs are a right pyramid in shape.

5. The system of interconnecting units according to claim 1, further comprising:
    a first magnet located along the first axis of the first unit.

6. The system of interconnecting units according to claim 5, further comprising:
    a second magnet located along the first axis of the second unit.

7. The system of interconnecting units according to claim 1, further comprising:
    a first lip located around the first stud of the first unit.

8. The system of interconnecting units according to claim 1, further comprising:
    a third unit, having;
    a plurality of studs located on a first surface.

9. The system of interconnecting units according to claim 1, further comprising:
    a third unit, having;
    a plurality of recesses located on a first surface.

10. An interconnecting unit comprising:
a first member along a first axis having a recess on the first end and a stud on the second end opposite the first end: and
a second member along a second axis having a recess on the first end and a stud on the second end opposite the first end:
wherein the first member is orthogonal and integral to the second member;
wherein the stud and the recess are of a complementary, tapered shape; and
wherein each member has a cross-section with a base-width equal to the base-width of the stud of that element.

11. The interconnecting unit according to claim 10 wherein all of the studs are conical in shape.

12. The interconnecting unit according to claim 11 wherein all of the studs are rounded.

13. The interconnecting unit according to claim 10 wherein all of the studs are a right pyramid in shape.

14. The interconnecting unit according to claim 10, further comprising:
a first lip located around each recess; and
a second lip located around each stud.

15. The interconnecting unit according to claim 10, further comprising:
a first magnet located between the stud and the recess of the first member.

16. The interconnecting unit according to claim 10, further comprising:
a first magnet located in the stud of the first member; and
a second magnet located in the recess of the first member.

17. The interconnecting unit according to claim 10, further comprising:
a third member along a third axis; and
wherein the third member is orthogonal and integral to the second member.

18. The interconnecting unit according to claim 17, wherein the third member is comprised of a stud and a recess.

19. The interconnecting unit according to claim 17, further comprising:
a magnet located in the stud of the third member.

20. The interconnecting unit according to claim 19, further comprising:
a magnet located in the recess of the third member.

* * * * *